United States Patent [19]

Fujita et al.

[11] Patent Number: 5,292,616
[45] Date of Patent: Mar. 8, 1994

[54] OPTICAL CARD OF CLOSED TYPE

[75] Inventors: Minoru Fujita; Yuji Kakinuma; Yoichi Fukushima, all of Tokyo, Japan

[73] Assignee: Kyodo Printing Co., Ltd., Tokyo, Japan

[21] Appl. No.: 651,362

[22] PCT Filed: Oct. 19, 1990

[86] PCT No.: PCT/JP90/01352

§ 371 Date: Feb. 12, 1991

§ 102(e) Date: Feb. 12, 1991

[87] PCT Pub. No.: WO91/06098

PCT Pub. Date: May 2, 1991

[30] Foreign Application Priority Data

Oct. 20, 1989 [JP] Japan .................. 1-271516

[51] Int. Cl.⁵ .................. G11B 7/24; G03C 1/00
[52] U.S. Cl. .................. 430/271; 430/495; 430/945; 430/270; 340/135.1; 369/284; 369/283
[58] Field of Search .............. 430/945, 271, 273, 495, 430/396; 346/135.1, 76 L; 369/283, 284

[56] References Cited

U.S. PATENT DOCUMENTS

| | | | |
|---|---|---|---|
| 4,176,277 | 11/1979 | Bricot et al. | 430/273 |
| 4,230,939 | 10/1980 | de Bont et al. | 430/495 |
| 4,358,780 | 11/1982 | Sato | 346/135.1 |
| 4,360,820 | 11/1982 | Forster et al. | 346/76 L |
| 4,379,299 | 4/1983 | Fitzpatrick et al. | 346/135.1 |
| 4,638,335 | 1/1987 | Smith et al. | 369/284 |
| 4,673,626 | 6/1987 | Takeda et al. | 430/14 |
| 4,752,554 | 6/1988 | Sato et al. | 430/273 |
| 4,877,713 | 10/1987 | Fujita et al. | 369/284 |
| 4,948,706 | 8/1990 | Sugihara et al. | 430/270 |
| 4,956,215 | 9/1990 | Fujita et al. | 369/288 |
| 5,026,623 | 6/1991 | Imataki et al. | 430/273 |
| 5,085,925 | 2/1992 | Hiraoka et al. | 430/945 |
| 5,173,391 | 12/1992 | Hiraoko et al. | 430/945 |

FOREIGN PATENT DOCUMENTS 60-10431 1/1985 Japan .
61-220148 9/1986 Japan .
63-271741 11/1988 Japan .

*Primary Examiner*—Charles L. Bowers, Jr.
*Assistant Examiner*—Martin Angebranndt
*Attorney, Agent, or Firm*—Kane, Dalsimer, Sullivan, Kurucz, Levy, Eisele & Richard

[57] ABSTRACT

A technique of an optical card having high information recording density. A specially superior writing characteristic is required for an additional recording optical card among optical cards. In the case where the optical card of additional recording type is closed, reduction in the writing characteristic is observed. In this invention, a sensitizing layer (50), which serves as escape for molten recording material at writing, is provided in rear of an optical recording section (30), so that an optical card is produced which is superior in both environmental resistance and writing ability. The sensitizing layer (50) is made of self-oxidizable or thermoplastic resin and an absorbing agent dispersed in the resin. The absorbing agent cooperates with the resin not only to improve a writing characteristic, but also to improve design ability and reading ability of the card.

11 Claims, 2 Drawing Sheets

OPTICAL CARD OF CLOSED TYPE

TECHNICAL FIELD

This invention relates to an optical card, that is, an optical recording card in which information is optically written in an optical recording section in or on the card, and the written information is optically read and, more particularly, to an optical card of closed type in which an optical recording section, onto which information is recorded, is isolated from the outside environment.

BACKGROUND ART

Generally, an optical card has extremely high information recording density as compared with other recording cards such as a magnetic card, and IC card and so on. The optical card has an optical recording section on one side of a substrate. Information is recorded onto the optical recording section by an optical energy, chiefly, a laser light. Based on the difference in optical reflectivity between a recorded portion and an unrecorded portion, the recorded information is optically read back.

The general background of the optical card constructed as described above is disclosed in U.S. Pat. No. 4,680,460 or U.S. Pat. No. 4,673,626, for example. As will be seen from these patents, the optical card is broadly divided into two categories. One of them is an read only optical card in which a user performs only reading-out, that is, an optical card of ROM (Read Only Memory) type. The other is an additional recording optical card in which the user performs also writing, that is, an optical card of WO (Write Once) type.

A first characteristic required for a recording material in the optical card of WO type is a writing characteristic. In view of this, a recording material of pitted type is preferable which is comprised of a low-melting-point metal such as tellurium, bismuth or the like or its alloy. Conversely, however, the more superior the writing characteristic, the more the recording material tends to be influenced by the outside environment, negatively affecting other characteristics such as durability and so on.

As a method of improving the environmental resistance, means are known for isolating the optical recording section made of pitted type recording material, from the outside environment. For example, an optical recording section of an optical disks is enclosed between a pair of substrates of the optical disc while providing an air gap. Here, the air gap is provided for recording material that is melted due to heat, in order to prevent the writing characteristic from being deteriorated.

A technique is also known in which the closing method having an air gap is applied to an optical card (Japanese Patent Provisional Publication No. SHO 61-96539). It cannot be said, however, that the technique is suitable for wide usage such as carrying or the like of the optical card, because it is believed that the air gap causes disadvantages such as reducing compactness and strength of the card.

DISCLOSURE OF THE INVENTION

It is an object of this invention to provide a new or novel technique of an optical card construction in which, in spite of the fact that the card is of a closed construction and thereby superior in environmental resistance, the optical card also being superior in writing characteristics and other card characteristics.

This invention is widely applicable to various kinds of optical cards of WO type of construction in which an optical recording section is closed. Methods of closing the optical recording section include entirely covering the optical recording section on one side of a light transmittive substrate by a protective layer, or enclosing the optical recording section between a pair of card substrates in a sandwich fashion, or a method wherein a substrate supporting the optical recording section is made of a flexible sheet, or where the optical recording section on the sheet is enclosed between a pair of reinforcing substrates together with the sheet in a sandwich fashion, or the like.

This invention is also directed to an optical card using any one of the aforementioned enclosing methods. In either case, a sensitizing layer made of a self-oxidizable or thermoplastic resin is laminated onto the optical recording section made of a pitted-type recording material directly adjacent the sensitizing layer. The self-oxidizable resin is a resin lower in decomposition (oxidizing) temperature than its melting point. The sensitizing layer is located behind of the optical recording section, when viewed from one side of the substrate upon which a recording light is incident. This specific positional relationship is important in forming pits to insure superior writing characteristics on a repeatable basis further, is important also to produce high contrast for reading.

The sensitizing layer functions such that, when information is written on the optical recording section, a recording material escapes into a layer of the recording material due to the energy of the recording light. For this reason, an attempt can be made to improve the writing characteristics. This improvement in the writing characteristic is particularly noticeable or remarkable when an absorbing agent effectively absorbing optical energy of the recording light is contained in the sensitizing layer and, slightly more specifically, when green to blue dyes or black dyes in complementary-color relation to a laser light in a near-infrared range is contained in the sensitizing agent.

Here, description will be made along experimental examples, regarding improvement in the writing characteristic. In this connection, a laser light, which is used in each of experiments, is an infrared laser light whose wavelength is 830 nm and whose spot size is 6.5 μm.

TABLE 1

| Sensitizing Layer | Affection or Influence due to Absence of Sensitizing Layer | | | |
|---|---|---|---|---|
| | Sensitizing Layer Membrane Thickness (μm) | Te Membrane Thickness (Å) | Mean Pit Diameter (μm) | Contrast (±3σ) |
| None | — | 360 | 3.5 | 0.49 (±0.05) |
| Nitrocellulose (HIG i, Asahi Chemical Industry Co., Ltd.) | 2 | 370 | 2.3 | 0.41 (±0.01) |
| Polyvinyl Chloride-acetate Copolymer resin (Vinylite-resin, | 2 | 360 | 2.5 | 0.48 (±0.01) |

TABLE 1-continued

| Sensitizing Layer | Affection or Influence due to Absence of Sensitizing Layer | | | |
|---|---|---|---|---|
| | Sensitizing Layer Membrane Thickness (μm) | Te Membrane Thickness (Å) | Mean Pit Diameter (μm) | Contrast (±3σ) |
| Union Carbide Corp.) Polyvinyl butyral (S-LEC B, Sekisui Chemical Co., Ltd.) | 2 | 360 | 2.5 | 0.47 (±0.01) |
| Polymethyl methacrylate | 3 | 370 | 2.4 | 0.45 (±0.02) |
| Polyvinylidene chloride (SARAN 202, Asahi Chemical Industry Co., Ltd.) | 2 | 362 | 3.0 | 0.47 |

As will be seen from the Table 1, in the case where there is no sensitizing layer, variation in contrast ration (ten (10) point measurement) is large, whereas, when a sensitizing layer is provided variation is reduced. Effects due to the reduction of the variation can be seen in the self-oxidizable resin such as nitrocellulose, and also in the thermoplastic resins.

TABLE 2

| Sensitizing Layer + Dyes | Affection or Influence When Dyes are contained in Sensitizing Layer | | | |
|---|---|---|---|---|
| | Sensitizing Layer Membrane Thickness (μm) | Te Membrane Thickness (Å) | Mean Pit Diameter (μm) | Contrast (±3σ) |
| Nitrocellulose + Near-Infrared Absorbing Dyes (IR-820, Nippon Kayaku Co., Ltd.) (HIG ↓: IR-820 = 14:1 | 2 | 310 | 3.9 | 0.59 (±0.02) |
| HIG ↓: IR-820 = 10:1 | 1 | 360 | 4.1 | 0.62 (±0.02) |
| HIG ↓: IR-820 = 6.7:1 | 2 | 366 | 4.2 | 0.59 |
| SARAN 202: IR-820 = 10:1 | 2 | 361 | 4.6 | 0.68 |

As will be seen from comparison of the results of table 2 with those of table 1, addition of the near-infrared absorbing dyes to the sensitizing layer enables the writing sensitivity to be improved (therefore, the pits can be enlarged), and enables the contrast ratio to be further raised. A greater amount of dye is preferred in order to raise the contrast ratio. It is sufficient, however, if the dyes are present on the order of 5% by weight ratio.

As described above, the sensitizing layer located adjacent the optical recording section functions so as to improve the writing characteristic with respect to the optical recording section, and because it is enclosed, thereby creating an enclosed optical card, greater environmental resistance is provided.

BEST MODE FOR CARRYING OUT THE INVENTION

Figure 1:
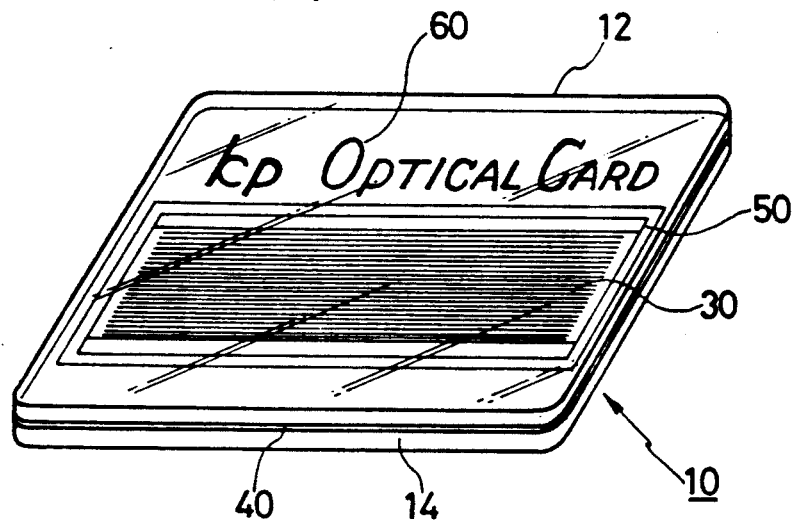
FIG. 1 is a perspective view showing a first embodiment of a hermetic-type or enclosed type optical card according to this invention.
Figure 2:
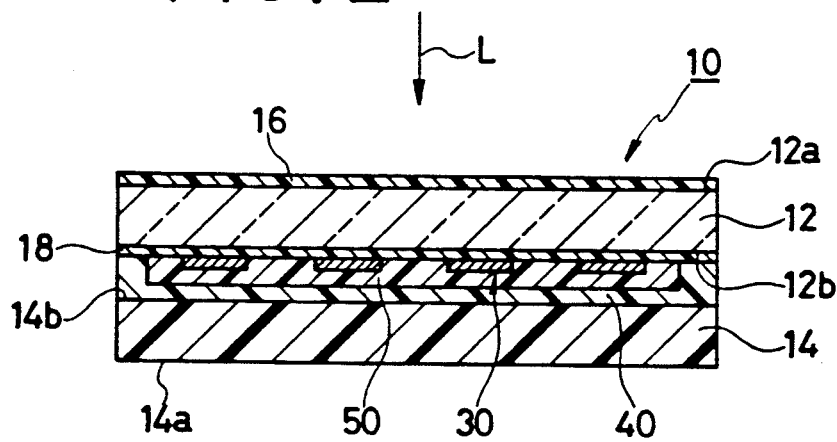
FIG. 2 is a view showing a cross-sectional construction of the optical card illustrated in FIG. 1.

First Embodiment . . . FIGS. 1 and 2

An optical card 10 is constructed so that an optical recording section 30 having a pre-formatted pattern is sandwiched between a transparent card substrate 12 on the top surface side and an opaque card substrate 14 on the bottom surface side, and is thereby enclosed.

It is required that a laser light for writing and reading is sufficiently transmitted through at least one of the card substrates 12 and 14. The card substrate 12 on the front-surface side is made of polycarbonate sheet exhibiting light transmittance and having a thickness of 0.4 mm. The substrate 12 two sides 12a and 12b which extend in parallel relation to each other. A hard coating layer 16, whose thickness is about 5 μm, is formed on the first side 12a. Side 12a having the hard coating layer 16 is the side upon which the laser light L is incident for writing and reading. The hard coating layer 16 protects the surface of the first side 12a of the card substrate 12. An anchor layer 18, whose thickness is of the order of 0.5 μm, is formed on the second side 12b of the card substrate 12. The optical recording section 30 is formed on the anchor layer 18. The anchor layer 18 is provided for improving adhesiveness between the card substrate 12 and the optical recording section 30, and is made of silicon acrylic resin layer, for example. Further, the optical recording section 30 is made of Te whose thickness is of the order 350 Å. A predetermined format pattern is formed on the optical recording section 30 per se by photoetching.

The card substrate 14 on the bottom side is made of a hard vinyl chloride sheet whose color is white and whose thickness is 0.35 mm. The card substrate 14 has sides 14a and 14b which extend in parallel relation to each other. Printing such as silk-screen printing, UV-offset printing or the like is applied to side 14 a, while an urethane adhesive layer 40 of normal temperature hardened type, whose thickness is about 20 μm, is formed entirely on side 14b. The thus formed card substrate 14 is attached to the card substrate 12 on the top side with an adhesive of normal-temperature hardened type thereby permitting the card substrates 12 and 14 on the top and bottom sides to be stuck together without the use of heat pressing. For this reason, the card substrates 12 and 14 on the front and rear sides are not subject to heat shrinkage that would occur due to a difference in material between the card substrates 12 and 14. Thus, it is possible to avoid curling of the card.

The optical recording section 30 is formed on the side 12b of the card substrate 12, to which the card substrate 14 on the bottom side is stuck. A sensitizing layer 50 is covered on the optical recording section 30. Sensitizing layer 50 may be comprised of thermoplastic resins and self-oxidizable resins. In this example, however, polyvinylidene chloride paint containing near-infrared absorbing dyes was used. Silk-screen printing was employed in formation of the sensitizing layer 50, and its thickness was about 2 μm. In this case, the sensitizing layer 50 has an area greater than the optical recording section 30. However, the sensitizing layer 50 is narrower than the optical recording section 30 in dimension as a card. For this reason, when both the card substrates 12 and 14 on the front and rear sides are stuck together, the optical recording section 30 is protected by both the sensitizing layer 50 and the adhesive layer 40. By such double protection, the optical recording section 30 is effectively isolated from the outside environment, so that environmental resistance is improved. Further, sensitizing layer 50 improves the writing characteristic of the optical recording section 30, of the optical card 10 and also since the sensitizing layer 50 cooperates with the printing characters 60 which are provided on the card substrate 12 or the like, design effects or advantages of the optical card 10 are improved.

In practice, the results of experiments conducted on the optical card 10 regarding the writing characteristic and the durability indicated superior characteristics. For example, regarding the writing, when the aforesaid infrared laser light of 830 nm wavelength was used, it was possible to produce a sufficiently large contrast ratio by writing power of the order of 8 mW for irradiation time of 150 μ sec and of the order of 11 mW for irradiation time of 50 μ sec. Further, in an immersion test of medicine resistance known in the field of magnetic cards, that is, when the card was immersed, for forty-eight (48) hours at the room temperature, in each of liquids such as a 5% saline solution, a 5% acetic solution, a 1% sodium hydroxide solution and a 1% sodium carbonate decahydrate solution, the error rate did not change from the beginning of the immersion to completion of the immersion, and was of on the order of $10^{-5}$.

Figure 3:
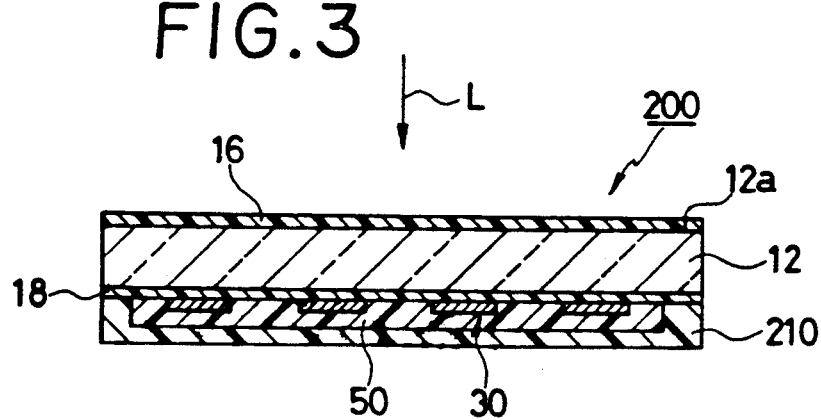
FIG. 3 is a cross-sectional view showing a second embodiment of the optical card according to the invention.

Second Embodiment . . . FIG. 3

When compared to the first embodiment, an optical card 200 according to this second embodiment utilizes a coated protective layer 210 in place of the card substrate 14 on the bottom side and in place of the adhesive layer 40 in the optical card 10 according to the first embodiment. As the protective layer 210, a material used which can uniformly cover the surface of the sensitizing layer 50 as a whole to isolate the outside humidity and the like, for example, a general resin is employed such as UV hardening type, acrylic type or the like. A commercially available resin can be used as the resin of UV hardening type as it is. Also for the resin of acrylic type, the viscosity can be regulated or adjusted for coating by the use of a solvent (alcohol, toluene or the like) which does not exert a bad influence to the sensitizing layer 50. In the case of the optical card 200, since an adhesive step between the substrates can be omitted or dispensed with, manufacturing is more easy.

Figure 4:
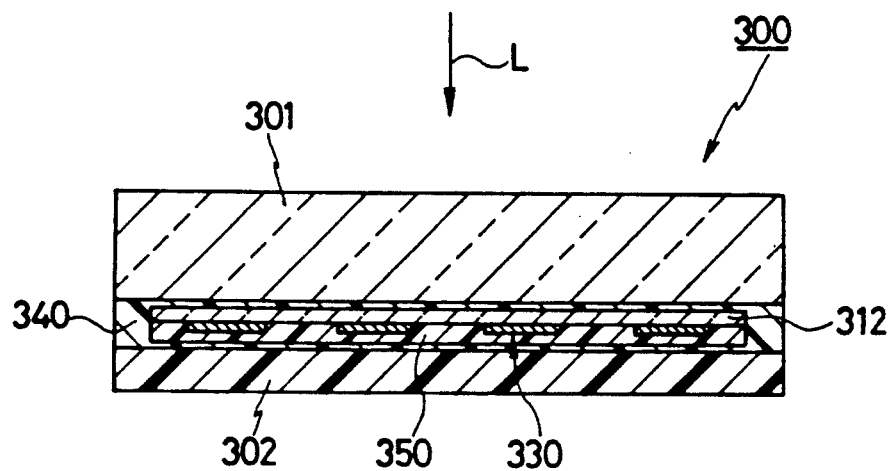
FIG. 4 is a cross-sectional view showing a third embodiment of the optical card according to the invention.

Third Embodiment . . . FIG. 4

For an optical card 300 according to the third embodiment, the substrate 12 in the optical card 10 according to the first embodiment is formed by a flexible sheet 312 and, after an optical recording section 330 and a sensitizing layer 350 have been formed on the sheet 312, the sheet 312 including the optical recording section 330 and the sensitizing layer 350 is sandwiched between a light-transmittance first reinforcing substrate 301 and an opaque second reinforcing substrate 302. For the optical card 300, the sheet 312 is formed slightly smaller in dimension than the first and second reinforcing substrates 301 and 302, so that it is possible to fill up any gap portions occurring on the lateral sides of the card, by an adhesive layer 340. Accordingly, it is possible the close the optical recording section 330 in the interior of the card and provide sufficient environmental resistance. Further, since the sheet 312 of optical and 300 is flexible, it is possible to form the optical recording section 330 and the sensitizing layer 350 by rolling the sheet 312. Furthermore, since the sheet 312 forming the optical recording section 330 and the sensitizing layer 350 can be treated or handled as a semiproduct, it is easy to apply known processing such as printing or the like to the first and second reinforcing substrates 301 and 302.

Figure 5:
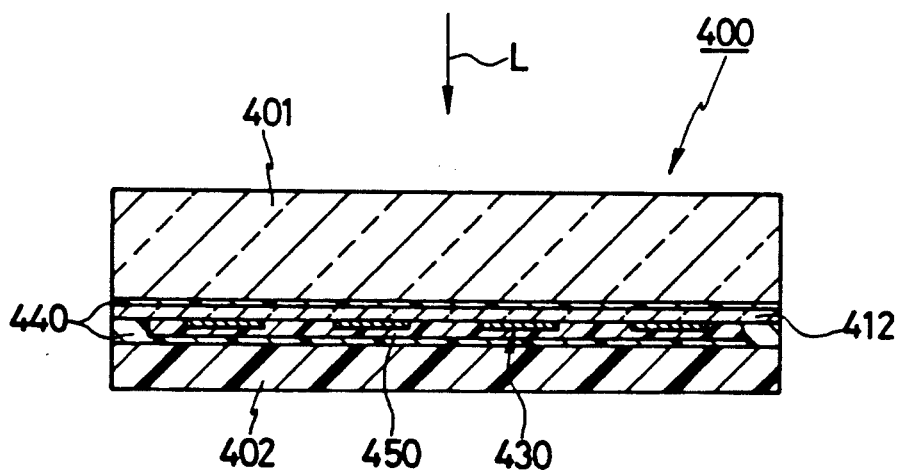
FIG. 5 is a cross-sectional view showing a fourth embodiment of the optical card according to the invention.

Fourth Embodiment . . . FIG. 5

An optical card 400 according to the embodiment is a modification of the third embodiment. Here, a sheet 412, which supports an optical recording section 430 and a sensitizing layer 450, has a dimension which is the same as those of first and second reinforcing substrates 401 and 402. It is possible, however, to close the lateral sides of the optical recording section 430 by the sensitizing layer 450 and a pair of adhesive layers 440.

In connection with the above, the material and the technical specification of the first and second reinforcing substrates 301 and 401; and 302 and 402 in the third and fourth embodiments are the same as those of the light-transmittance substrate 12 and the card substrate 14 in the first embodiment.

INDUSTRIAL APPLICABILITY

As described above, it is possible for the invention to still produce the superior writing characteristic even if the optical card of WO type, whose recording material is tellurium easy in writing, its alloy or the like, is of a closed construction high in environmental resistance. Thus, the optical card is extremely high in practicality as an optical card superior in both sides of the writing characteristic and the environmental resistance, and is useful in diffusion of the optical card.

What is claimed is:

1. An enclosed-type optical card wherein optical recording section for recording information is isolated from an environment outside the optical card, said optical card comprising a first substrate capable of transmitting light having a first side and a second side, said first and second sides extending in parallel relation to each other, the first side of the first substrate being a writing side upon which a writing light is incident, an optical recording section located on said second side of said substrate, said optical recording section being capable of recording information such that pits are formed by optical energy of said writing light, said optical recording section including a thin membrane layer made of a recording material having light reflectivity, a sensitizing layer having first and second sides, the sensitizing layer being directly laminated on said optical recording section, said sensitizing layer being comprised of a self-oxidizable or thermoplastic resin, said sensitizing layer providing means for the escape of molten recording material when pits are formed in said optical recording section and means for enclosing said optical recording section, said means including a coating layer coated upon said sensitizing layer wherein said coating layer is an adhesive layer having first and second sides, and wherein said adhesive layer is attached to said second side of the first substrate such that said optical recording section is sandwiched between said adhesive layer and said second side of said first substrate and wherein a second card substrate is attached to the adhesive layer on the second side of adhesive layer, and wherein the optical recording section is smaller in dimension then the first substrate capable of transmitting light, wherein the optical recording section is enclosed within the adhesive layer and the sensitizing layer on lateral sides of the optical card.

2. The optical card according to claim 1, wherein said sensitizing layer is comprised of the thermoplastic resin and further contains an absorbing agent which is dispersed in said resin for absorbing said writing light.

3. The optical card according to claim 2, wherein said absorbing agent is a near-infrared absorbing agent having an absorbing region in a near infrared.

4. The optical card according to claim 1, wherein said first side of said first substrate is a writing side and is also a reading side upon which a reading light is incident.

5. The optical card according to claim 1 wherein the first substrate capable of transmitting light, the second card substrate, the optical recording section and the adhesive layer each define an area, with the areas of the optical recording section and the adhesive layer being smaller than the areas of the first substrate capable of transmitting light and the second card substrate.

6. The optical card according to claim 5, wherein said adhesive layer coats said sensitizing layer as a whole and fills up a gap between said first substrate and said second card substrate at a peripheral edge portion of said sensitizing layer.

7. The optical card according to claim 1, wherein said first substrate capable of transmitting light is made of a flexible sheet, and wherein a light transmittive reinforcing substrate is attached to said first side of said sheet through the adhesive layer, and the second card substrate is attached onto said optical recording section and said sensitizing layer on said second side of said sheet through the adhesive layer.

8. The optical card according to claim 7 wherein the second card substrate is opaque.

9. The optical card according to claim 1, wherein said recording material is made of a low-melting-point metal or its alloy.

10. The optical card according to claim 9, wherein said recording material is made of tellurium or its alloy.

11. The optical card according to claim 1 further comprised of an anchor layer located between the second side of the first substrate and the adhesive layer.

* * * * *